Dec. 11, 1923.
B. S. AIKMAN
1,477,161
UNLOADER FOR COMPRESSORS
Filed Oct. 23, 1922
2 Sheets-Sheet 1
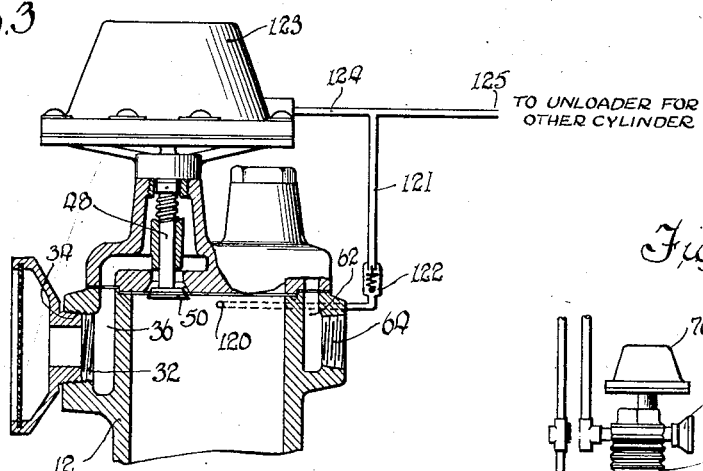
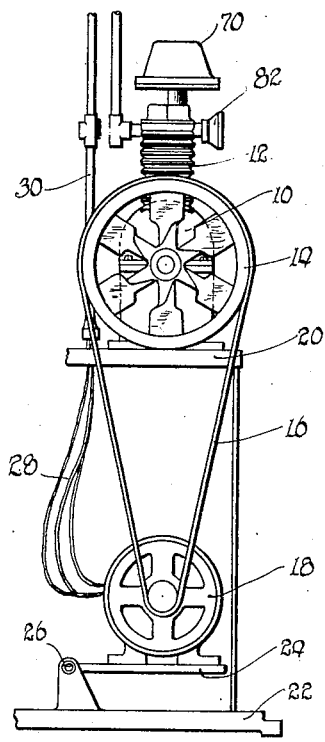
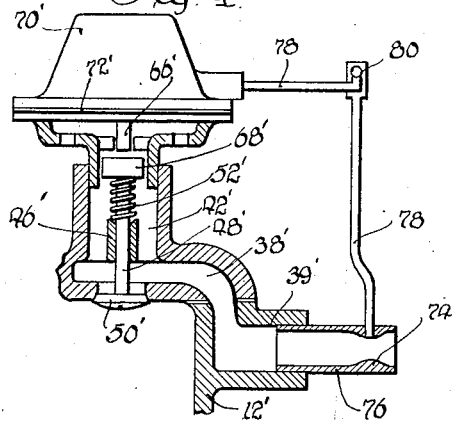
Inventor
Burton S. Aikman
By Brown Boucher and Dinner
Att'ys

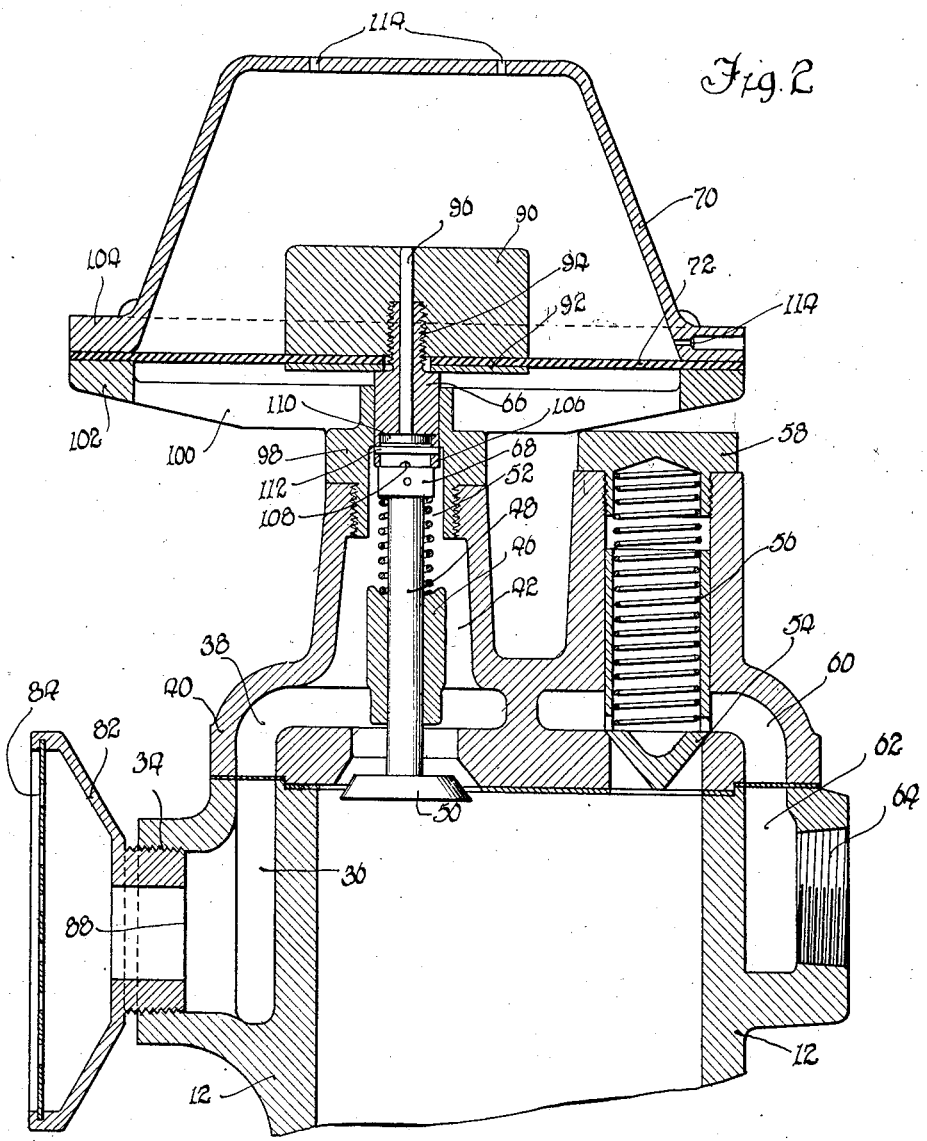

Patented Dec. 11, 1923.

1,477,161

UNITED STATES PATENT OFFICE.

BURTON SILAS AIKMAN, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

UNLOADER FOR COMPRESSORS.

Application filed October 23, 1922. Serial No. 596,227.

*To all whom it may concern:*

Be it known that I, BURTON S. AIKMAN, a citizen of the United States, residing at Milwaukee, in the county of Milwaukee and State of Wisconsin, have invented a certain new and useful Improvement in Unloaders for Compressors, of which the following is a full, clear, concise, and exact description, reference being had to the accompanying drawings, forming a part of this specification.

My invention relates to unloaders for air compressors and the like.

It is common practice nowadays to drive an air compressor by means of an electric motor. The starting of an air compressor requires a high initial torque and this means high starting current at the motor. A large flow of current upon starting a motor is generally objectionable on an electric distribution system as it spoils the regulation of the system, causing the voltage to drop. The large rush of current is further objectionable because of the heating effect it has and the danger to the fuse, the switches and the motor itself.

Most electric systems involving transmission to any considerable distance employ alternating current because of the ease of voltage transformation. However, alternating current motors such as are now on the market and available for this class of work, have relatively low starting torque but have an initial rush of current at least 3 or 4 times full load current. Due to the low starting torque and the excessive starting current and the objections which these features entail, it is inadvisable to attempt to start an air compressor under load. The starting of an air compressor under load is often made more difficult and in fact almost impossible by leakage of compressed air back into the compressor cylinder. Where this occurs the torque required to turn the compressor over is increased because of the pressure which prevails in the compressor cylinder.

Due to starting the stroke under initial pressure, the discharge pressure in the cylinder will be reached much earlier when the crank of the compressor is at a less advantageous position and therefore a much higher torque is required to turn the compressor over.

Hence, it is desirable to unload the compressor so that it will not have any initial pressure upon starting due to leakage and so that the motor may pick up speed before the work of compressing begins.

Whereas, the most commonly used motor is an induction type of AC motor known as the squirrel cage motor, there are other types which may also be used, such as the wound rotor type, the Wagner type which starts as a repulsion motor and then throws off its brushes and continues as an induction motor. The above statement also holds true for direct current motors. Small compressors are often driven by internal combustion engines which may be started either automatically or by hand. The same feature of desirability of unloading the compressor prevails.

Numerous attempts to provide a simple inexpensive and reliable unloader have been made. I have experimented with numerous types of unloaders, such as centrifugal unloaders, centrifugal clutches between the motor and the compressor, combined air and centrifugal unloaders, hydraulic unloaders and the like. I find that controllers employing centrifugal governors or clutches are not sufficiently reliable or accurate to obviate all the difficulties encountered. Particularly is this true when the brush shifting type of motor is employed. I have found, for instance, that in the brush shifting type the motor may come up closely enough to speed as a repulsion motor without shifting of the brushes that its load will be applied. This then slows the motor down so far that it will not reach the speed required for shifting its brushes and the motor will run along under improper conditions and will finally overheat and burn out.

The hydraulic unloader is satisfactory but far too expensive for small compressor work.

According to the present invention I unload the compressor by holding the inlet valve normally open by a spring or weight and apply the load by raising this spring or weight only when a speed of movement of the compressor piston has been attained which will correspond to full motor speed.

The speed of the piston depends upon the speed of the motor, and where the motor and compressor are connected as by means of a belt the speed of the compressor piston is a function of the speed of the motor shaft.

According to the present invention I measure the speed of the compressor piston by measuring the rate at which it carries a flow of air through an orifice. This orifice may be the intake orifice. Thus assume the intake valve of a compressor to be held open and the compressor to be turned over. As the piston moves down the air will flow into the cylinder and as the piston makes the return stroke the air will flow out. The rate of inflow will correspond with the rate of movement of the piston. By means of suitable measuring means such as a pitot tube the velocity of movement of the air through the orifice may be measured. Instead of measuring the rate of flow by a Pitot tube I may measure the rate of flow by the drop of pressure created by the flow through the orifice. Since the flow of air reverses at each stroke I preferably employ a check valve between the region of depression and the pressure responsive element. Also since the flow follows the law of the sine wave I employ only the maximum of each wave of flow. This permits accurate readings to be taken. The use of the check valve automatically limits the response of the pressure responsive element to maximum values.

The pressure responsive element which I employ is preferably a diaphragm for raising by suction the weight or spring from the intake valve.

Now I wish to call attention to the fact that not only does my device take into account the element of speed, but also a certain time element.

The centrifugal governor is responsive to speed. But as I have above indicated it is difficult to graduate accurately to speed. Also after it has once thrown or shifted outwardly it requires a fairly large reduction in speed to cause it to drop back into unloaded position. Briefly, the upper limit, i. e., the rate of speed at which it acts cannot be sharply defined and the lower limit on a drop in speed is distant by too great a range.

The unloader of my invention has a control function in addition to piston speed and that is a certain time element. In other words, in order for my unloader to load the compressor, the motor must bring the compressor up to speed and hold such speed or a higher speed for a short period of time before the load is applied. Thus, if the compressor does not come to speed, obviously, the load is not applied. If the compressor does come to speed, but does not remain at speed for a predetermined period of time, the load will not be applied.

I secure this time element by providing a suction operated diaphragm which has a chamber of suitable capacity so that it takes a predetermined number of strokes and hence a certain period of time to evacuate it to the degree required to take the load off of the inlet valve. By permitting a slight leak into this chamber the time required to evacuate it may be further increased.

Thus for instance, assume that the motor runs at about 1800 under full voltage rate and about 1700 under full load. Now suppose that the controller is set so that at 1650 R. P. M. the evacuation of the diaphragm chamber begins and that it takes 3 seconds to evacuate the chamber sufficiently to cause loading of the compressors.

Assume now that the motor is started and it speeds up to 1650 R. P. M. where evacuation begins. The next 3 seconds permit the motor to speed up still further, say to 1750, before the load is applied. Thus the load is not applied until the critical speed is definitely passed.

I wish now to point to an important function which flows from my unloader due to the simultaneous operation of the two control functions. The motor must keep the compressor moving at a speed in excess of 1650 R. P. M. in order to keep the unloader from pressing the inlet valve off seat. If, due to any cause the motor is not able to turn the compressor faster than critical speed in about 1650 R. P. M. in the above example, the diaphragm will begin to move under the influence of the weight or the spring toward the inlet valve to block the same open.

Assume that the speed begins to drop down below the critical speed. Then the diaphragm begins to block the last part of the closing movement of the inlet valve. Hence, when the piston starts to make its compression stroke, some of the air will be driven past the inlet valve. But the pressure upon the lower face of the inlet valve will assist it to close against the small resistance of the diaphragm. Hence, the charge that is compressed is only a partial charge, i. e., less than a complete cylinder full. Naturally, this relieves the motor of some of the work and it tends to hang onto the critical speed. My unloader thus acts quantitatively to apply the load partially as the speed decreases to tend to hold up the speed of the motor by decreasing the load.

Since the control is pneumatic, any number of cylinders may be loaded and unloaded simultaneously by connecting the unloader cylinders together. Naturally, each cylinder may have a separate unloader individual to it.

I wish to point out further that the maximum drop of pressure due to the operation of the compressor piston is within the cylinder itself. Hence, instead of employing the drop in the intake passageway, I may make connection with the interior of the compressor cylinder through a check valve. This suction connection may be connected to one or more unloading cylinders for one or more compressor cylinders. Obviously, I do not limit the invention to compressors. Certain features may also be employed for other purposes and these also I intend to cover in the appended claims.

The invention is herein described in connection with electric motors for driving the compressor, but it is useful no matter what the type of the driving motor.

One size of unloader may be used over a range of compressor sizes. The only requirement being that the size of the unloader diaphragm be great enough in conjunction with the drop in pressure to remove the load of the unloader spring or weight from the inlet valve.

The unloader of my invention is simple and reliable and far less expensive than any other with which I am familiar. In addition to the above it has as I have pointed out above several novel functions.

In order to apprise those skilled in the art how to construct and operate a device embodying my invention, I shall now describe one specific form which I have constructed and satisfactorily operated.

In the accompanying drawings:

Figure 1 is a side elevation of a compressor unit embodying my invention;

Fig. 2 is an enlarged vertical section through the cylinder head;

Fig. 3 is a similar section showing a modification; and

Fig. 4 is a fragmentary sectional view of a further modification.

In the embodiment of my invention selected for illustration, the compressor 10 having a cylinder 12 and fly-wheel 14, has been illustrated as driven by a belt 16 from an electric motor 18. It will be obvious that another source of power may be substituted for motor 18.

The compressor is mounted on a supporting platform or shelf 20, forming part of a structure supported on a base 22. Motor 18 is carried by a movable base 24 pivoted at 26 so that the weight of the motor automatically tensions belt 16. Suitable power leads 28 are brought to the motor through conduit 30.

The compressor 10 may be of any usual or suitable construction. I have illustrated cylinder 12 as provided with an inlet opening 32 through the external threaded socket 34 and a passage 36 cored in the cylinder block, communicating with passage 38 cored in the cylinder head 40, which latter passage opens into a chamber 42, which surrounds the inlet valve stem and communicates with the inlet valve port. A central support 46 guides the stem 48 of inlet valve 50, and forms a seat for the valve spring 52.

The discharge check valve 54 which is held closed by spring 56 seated in retaining nut 58, controls communication with the delivery passage 60 leading out of the cylinder head into discharge passage 62 in the cylinder itself and threaded socket 64 for receiving the end of a suitable supply pipe.

The cylinder and cylinder head construction hereinabove described is old in the art and thus far forms no part of the present invention.

Referring now to the diagram in Figure 4, in which parts corresponding to those shown in Figure 2, have been indicated by the same reference characters primed, and bearing in mind that the compressor, when taking in a full charge and delivering against a predetermined pressure requires an average torque or driving force approximately constant over a wide range of speed, it will be apparent that to permit the source of power to come up to speed on starting, the compressor should be prevented from compressing its charge. This may be accomplished by holding the inlet valve 50' open, so that the charge taken in on the down stroke will be expelled through the inlet passages on the up stroke, and no appreciable work will be done by the compressor. The means I have indicated for performing this in Figure 4 comprise a vertically movable stem 66' positioned to engage the head 68' of the inlet valve stem 48' and hold the valve open. 70' is a diaphragm chamber of suitable capacity provided with a flexible spring or weight loaded diaphragm 72' on which member 66' is mounted. Due to the loading of the diaphragm 72 it normally presses its stem 66' down upon the head 68' of the inlet valve stem 48' holding the inlet valve 50' away from its seat.

I provide means sensitive to the rate of air flow in the inlet passageways (see Fig. 2) or sensitive to the drop in pressure between atmosphere and the interior of the cylinder (see Fig. 4) or the drop at any intermediate point (see Figs. 1 and 2).

Consider the showing of Fig. 4 for example. The rate of flow through a certain part of the intake passageway is proportional to compressor piston speed and this in turn is a function of motor or engine speed. If due to low voltage, excessive load or excessive friction, or any other cause, the motor does not come up to speed and hence to full power the load of the compressor should not be added to the motor. Obviously, in a device employing a reciprocating piston the piston speed for each stroke starts at zero and again drops to zero, hence it is necessary to take some measure of the velocity at an intermediate point. This might well be done by a valve moved in synchronism with the piston. I secure the result of a synchronous valve by means of a simple check valve. A check valve is more advantageous than a mechanically moved valve since it will open whenever and only when the pressure on the compressor side is below that of the unloader diaphragm chamber.

In Figure 4 I have illustrated a venturi 74 in the inlet pipe 76, and a conduit 78 controlled by check valve 80 communicating with the throat of the venturi. In this way, air will be sucked out of conduit 78, whenever a flow is established either into or out of the cylinder. A check valve 80 is positioned in conduit 78 to permit flow toward, but not away from venturi 74. If, now, a spring, weight or other suitable means be employed to normally depress unloader diaphragm 72' and its stem 66' into contact with head 68' and open the inlet valve, the valve will normally be open continuously when the compressor is not operating. When the compressor is started, suction increasing with the speed of the compressor will be delivered intermittently to conduit 78, and check valve 80 will cooperate with this fluctuation to continually withdraw air from above diaphragm 72 until if the speed is great enough, the diaphragm chamber will be evacuated to a point where the effect of the spring or weight is overcome, stem 66' is raised, and the inlet valve begins to function and load the compressor.

Turning now to the actual embodiment illustrated in Figure 2, the suction or pressure drop created in chamber 42 is adequate for the purpose of actuating or raising the unloader diaphragm. An intake strainer is preferably provided, comprising a flared casing 82 (see Figs. 2 and 3) provided with a perforated diaphragm or screen 84 for preventing the entry of solid particles with the incoming air. This strainer or an inlet pipe offers a very small resistance to the flow of air at the point of maximum speed of the piston with the result that a drop of pressure suitable for raising the diaphragm 72 is created.

Diaphragm 72 underlies weight 90, and overlies a washer 92, the parts being clamped in place by a threaded stem 94 extending upward from element 66 and threaded into weight 90. An axial bore 96 extends up through stem 66 and weight 90 for withdrawing air from chamber 70. Stem 66 slides vertically in a central bore in the hub or boss 98, which boss carries spider arms 100 and an outer clamping ring or flange 102 for cooperation with the flange 104 of chamber 70 to clamp diaphragm 72 in place. The lower end of the diaphragm stem 66 is counterbored at 106 to form a housing and valve seat for check valve 110. This valve is held in place by a cross pin 112. The lower end of stem 66 is adapted to engage the head 68 of the valve stem. Transverse passageways 108 formed as notches in the end of stem 66 permit of communication between chamber 42 and the valve 110. For regulating the speed at which the device will begin to operate and permitting chamber 70 to refill and lower weight 90 when the device stops, a plurality of vents or bleed openings 114 are provided in the walls of chamber 70. These air inlet openings also serve to control the time required for evacuation of the chamber to the point of raising the loading diaphragm so that a certain period of time will elapse after the critical speed is reached before the loading of the compressor takes place. The chief control for the critical rate of speed is the loading of the diaphragm relative to its area. This operates as a measure of the degree of drop of pressure and thus of compressor speed.

The chief control for the time element is the capacity of the diaphragm chamber. The greater the capacity of the chamber the longer time will be required to evacuate it to the desired degree. The vents are modifications of the above elements of control.

The weight 90 is not great enough to open the check valve 50 when this valve is under the internal pressure of the compression stroke. However, upon the next suction stroke the weight always has a chance to operate if the diaphragm does not hold it out of the way of the stem of the inlet valve.

The operation of the unloader is as follows:

At all compressor speeds the suction or pressure drop in chamber 42 will be a definite function of the speed, increasing and decreasing with the speed. At all values of suction in the chamber 42 a corresponding equilibrium value of suction in chamber 70 will be reached after a comparatively short interval, such value depending upon the pressure drop in passage 36 through which air is drawn, and vents 114 through which air leaks in. Each downward or suction stroke of the compressor causes a drop in pressure in the cylinder and also a certain drop in the inlet chamber 42. Naturally the maximum drop exists in the cylinder itself and I employ this fact in the form shown in Fig. 3. Referring however to Figs. 1 and 2, when the suction stroke creates a drop in chamber 42 this drop in pressure permits air in the diaphragm chamber 70 to expand and flow past the check valve 110 through the transverse passageways 108 and into the chamber 42. This evacuation of the diaphragm chamber continues only during the suction stroke or that part of the suction stroke where the speed of the piston is great enough to open the valve 110. During the compression stroke the air flowing in through the orifice or orifices 114 tends to replace the air withdrawn.

If now as the motor accelerates the compressor the rate of piston travel becomes great enough to begin to remove air rapidly enough from chamber 70 to have an effect upon the diaphragm, the diaphragm does not instantly apply the load of the compressor. A certain brief but definite period of time is required to move sufficient air out of the chamber 70 to cause diaphragm 72 to raise the stem clear of the valve stem 48. While this stem 66 is moving up out of the way the cylinder may compress a partial cylinderful of air. During this period of time before the diaphragm causes full loading of the compressor, the motor has a further chance to speed up. In normal starting the acceleration of the motor is so rapid that this period of time is shortened and the load is applied quickly. However, if for some cause the motor does not accelerate, the compressor rapidly, then the partial loading occurs. Assume for instance, that due to low voltage the motor does not speed up rapidly and in fact, is slow to come to speed. Then the diaphragm 72 will not be lifted completely, but will begin to lighten the load upon the spring 52 of the intake valve to such a degree that upon the compression stroke the rush of air past the valve 50 will move the same to seat and the rest of the stroke is a compression stroke. Thus only a partial loading of the compressor occurs. This is a completely new function in an unloader of the speed controlled type so far as I am aware.

When the compressor has pumped its connected tank to a pressure and the load of the compressor tends to pull down the speed of the motor, this feature of the unloader is particularly valuable. If the speed begins to decrease toward the critical value which would correspond to a dangerous condition of overload on the motor, the unloader begins to function to permit only a partial charge to be taken into the cylinder. By suitable proportioning, the parts of the unloader in this critical region may be defined anywhere within limits in the speed range of the motor.

In Fig. 3 I have indicated the manner in which the invention may be carried out, employing the drop in the cylinder itself as a measure of the piston speed. In this case, I have provided a small air port 120 which opens into the clearance space of the cylinder. This port might equally well or even better open into the clearance space through the cylinder head. The port 120 communicates through a conduit 121 controlled by a suitable check valve 122 with the diaphragm chamber 123. This diaphragm chamber has a loaded suction operated diaphragm and stem as shown in Fig. 2 for engaging the top of the intake valve. The stem of the diaphragm in this case is solid since the air is withdrawn by way of a branch pipe 124 which enters the diaphragm chamber 123 through a boss on the side wall. The pipe 121 is shown as having another branch 125. This branch may lead to another diaphragm chamber for the unloader of another cylinder or compressor driven in unison with the compressor cylinder shown in Fig. 3. Suitable graduated air inlets are provided in chamber 123, as shown in Fig. 2.

The operation of this form of device is like that described in connection with Fig. 2. The air being withdrawn from the diaphragm chamber directly to the cylinder instead of through an intermediate passageway or chamber.

Where a number of cylinders are to be unloaded they may be provided individually with separate unloaders or they may be provided with one evacuating connection as indicated in Fig. 3, for several or all of the diaphragm chambers.

If the unloader is to be employed in any other position than shown, the loading of the diaphragm is secured by means of a spring. Obviously the invention is not limited to the poppet type of inlet valve, but may be employed with any other type of inlet valve such as a plate or grid inlet valve.

The device shown in Figs. 1 and 2 is adaptable as shown to many types and makes of compressors now on the market. With suitable modification it is applicable to any compressor.

I do not intend to be limited to the details shown or described.

I claim:

1. The method of loading a motor compressor unit, which comprises controlling the loading pneumatically as a function of the flow through an inlet passage of the compressor.

2. The method of loading a motor compressor unit, which comprises controlling the loading pneumatically as a function of the suction caused by a drop of pressure in the inlet passages of the compressor.

3. The method of loading a motor-compressor unit, which comprises holding the intake valve for the compressor normally open, and removing said holding force to close the valve in response to flow in the inlet passages of the compressor past said open valve.

4. In a compressor cylinder, in combination, an air compressor having an inlet valve and a piston, means normally holding said valve open, and suction means energized by the piston of the compressor for opposing the action of said first mentioned means to render it inoperative and permit said valve to function.

5. In an air compressor, the combination of a cylinder having a clearance space, an inlet valve, means normally holding said valve open, and suction means connected to the interior of the cylinder for opposing the action of said first mentioned means to render it inoperative and permit said valve to close.

6. In combination with an air compressor having an intake valve and a piston, a weight normally holding said valve open, and suction means energized by the movement of the piston for lifting said weight.

7. In combination with an air compressor having an intake valve, means normally holding said valve open, a suction device for rendering said holding means inoperative, and connections for delivering suction only from the intake passages of the compressor to said device.

8. In combination with an air compressor having an intake valve, means normally holding said valve open, a suction device for rendering said holding means inoperative, and connections for delivering suction from the intake passages of the compressor to said device.

9. In combination with an air compressor having an intake valve, a suction chamber, connections for determining the suction in said chamber as a function of the suction caused by drop of pressure in the intake passages of the compressor, and means normally holding the intake valve open and affected by the suction in said chamber to permit said valve to close.

10. In combination with an air compressor, a cylinder having an intake valve and an outlet valve, means normally holding the intake valve open when the compressor is not running, means actuated by suction for rendering said holding means inoperative said means being energized in response to flow of air into but not out of the cylinder.

11. In combination with an air compressor, a cylinder having an intake valve, a suction chamber, unloading means controlled by the suction in said chamber, connections for exhausting from said chamber into the cylinder of the compressor while said valve is open, and vent means permitting said chamber to fill slowly from atmosphere at all times.

12. In combination, an air compressor having an automatic inlet check valve, means for holding said valve open, a diaphragm adapted under the influence of a drop of pressure to disengage said holding means from said valve and a diaphragm chamber for said diaphragm influenced by the speed of the suction stroke of the compressor to actuate said diaphragm.

13. In combination, an air compressor having an automatic inlet valve, means for holding said valve against closing, and suction operated means operated by a predetermined drop in pressure of the air in passing into the compressor cylinder for opposing said holding means.

14. As a new article of manufacture, an unloader comprising a frame member having a hollow threaded stud, said stud providing a guideway for a diaphragm stem, a diaphragm chamber having a suction operated diaphragm and a stem, means within the diaphragm for pressing the same outwardly against external pressure, and a suction connection having a passageway leading into the diaphragm chamber, said stem being adapted to engage the stem of a suction operated inlet valve.

15. The method of loading a compressor which comprises, applying a load to the inlet valve to hold it normally away from its seat, creating a flow of air by the movement of the compressor piston and creating a drop in fluid pressure by said movement of the air past said valve in following said piston, and raising said load from the inlet valve by said drop in fluid pressure.

16. In combination, a compressor cylinder having an inlet valve, unloading means for yieldingly holding the inlet valve away from its seat, and means controlled by the speed of the compressor for gradually decreasing the holding force of said unloading means whereby the compressor may compress only a partial charge.

17. In combination, a compressor having a piston, an inlet check valve, an inlet passageway therefor, means for yieldingly holding the inlet check valve open, a diaphragm chamber having a diaphragm for raising said holding means, and means for withdrawing the air from said diaphragm chamber when the speed of the air through the inlet passageway attains a predetermined value.

18. In combination, a compressor having an inlet valve, loading means for yieldingly holding the inlet valve away from its seat, and pneumatic means controlled by compressor speed and requiring a predetermined period of time for its operation, for opposing said loading means.

19. In combination, a compressor having a head with a hollow boss, the end of the boss being internally threaded, a valve stem guide in the boss, a suction valve having a stem lying in and projecting above said guide, and an unloader comprising a frame member having a hollow threaded stud adapted to be threaded in the end of said hollow boss, said stud providing a guideway for a diaphragm stem, a diaphragm chamber having a suction operated diaphragm, a stem for said diaphragm, means within the diaphragm chamber for pressing the diaphragm outwardly against external pressure, and a suction connection having a passageway leading into the diaphragm chamber.

20. In an air compressor having a piston, an inlet valve, means for holding said inlet valve open, a suction responsive motor element energized by the suction stroke of the piston while said inlet valve is open for disabling said holding means.

21. The method of controlling the loading of a compressor which comprises, holding the compressor intake valve open, turning the compressor over at an increasing speed until the piston moves at a speed capable of creating a predetermined drop of pressure between atmosphere and the interior of the compressor, and then releasing said holding means by said drop of pressure.

In witness whereof, I hereunto subscribe my name this 18th day of October, 1922.

BURTON SILAS AIKMAN.